United States Patent [19]

Grenat

[11] 4,409,154
[45] Oct. 11, 1983

[54] METHOD AND APPARATUS FOR MANUFACTURING A WATERTIGHT OPTICAL FIBER CABLE

[75] Inventor: Bernard Grenat, La Mulatiere, France

[73] Assignee: Societe Anonyme dite Compagnie Lyonnaise de Transmissions Optiques, Clichy, France

[21] Appl. No.: 231,527

[22] Filed: Feb. 4, 1981

[30] Foreign Application Priority Data

Feb. 6, 1980 [FR] France .............................. 80 02563

[51] Int. Cl.$^3$ .............................................. B29D 11/00
[52] U.S. Cl. ................................... 264/1.5; 264/174; 425/114; 425/133.1; 425/145; 425/463
[58] Field of Search .................. 264/1.5, 1.6, 174; 425/133.1, 114, 145, 463

[56] References Cited

U.S. PATENT DOCUMENTS

| | | | |
|---|---|---|---|
| 1,143,942 | 3/1919 | Anderson | 156/172 |
| 3,556,635 | 1/1971 | Schrenk et al. | 264/1.5 |
| 4,172,106 | 10/1979 | Lewis | 264/174 |
| 4,218,551 | 8/1980 | Frese | 526/348.6 |
| 4,219,639 | 8/1980 | Mack et al. | 526/348.6 |
| 4,221,756 | 9/1980 | Piper | 264/174 |
| 4,239,871 | 12/1980 | Fukui | 526/348.6 |

FOREIGN PATENT DOCUMENTS

| | | |
|---|---|---|
| 2801231 | 7/1979 | Fed. Rep. of Germany . |
| 1479427 | 7/1977 | United Kingdom . |
| 2013960A | 8/1979 | United Kingdom . |

*Primary Examiner*—James B. Lowe
*Attorney, Agent, or Firm*—Sughrue, Mion, Zinn, Macpeak and Seas

[57] ABSTRACT

A method of manufacturing an optical fiber cable of the type which comprises at least one cellular cylindrical structure of plastic material having a plurality of longitudinal bores housing individual optical fibers and filled with a viscous substance. The viscous substance is injected around the fibers under pressure as they pass along tubes which each have a gap of some length so that said viscous substance can enter the tubes. The optical fibers coated with viscous substance are made to protrude beyond the ends of said tubes. A thermoplastic material is simultaneously extruded through an annular orifice and around the optical fibers under a pressure which is sufficient to completely surround said coated optical fibers. The cylindrical structure thus obtained is rapidly cooled.

4 Claims, 5 Drawing Figures

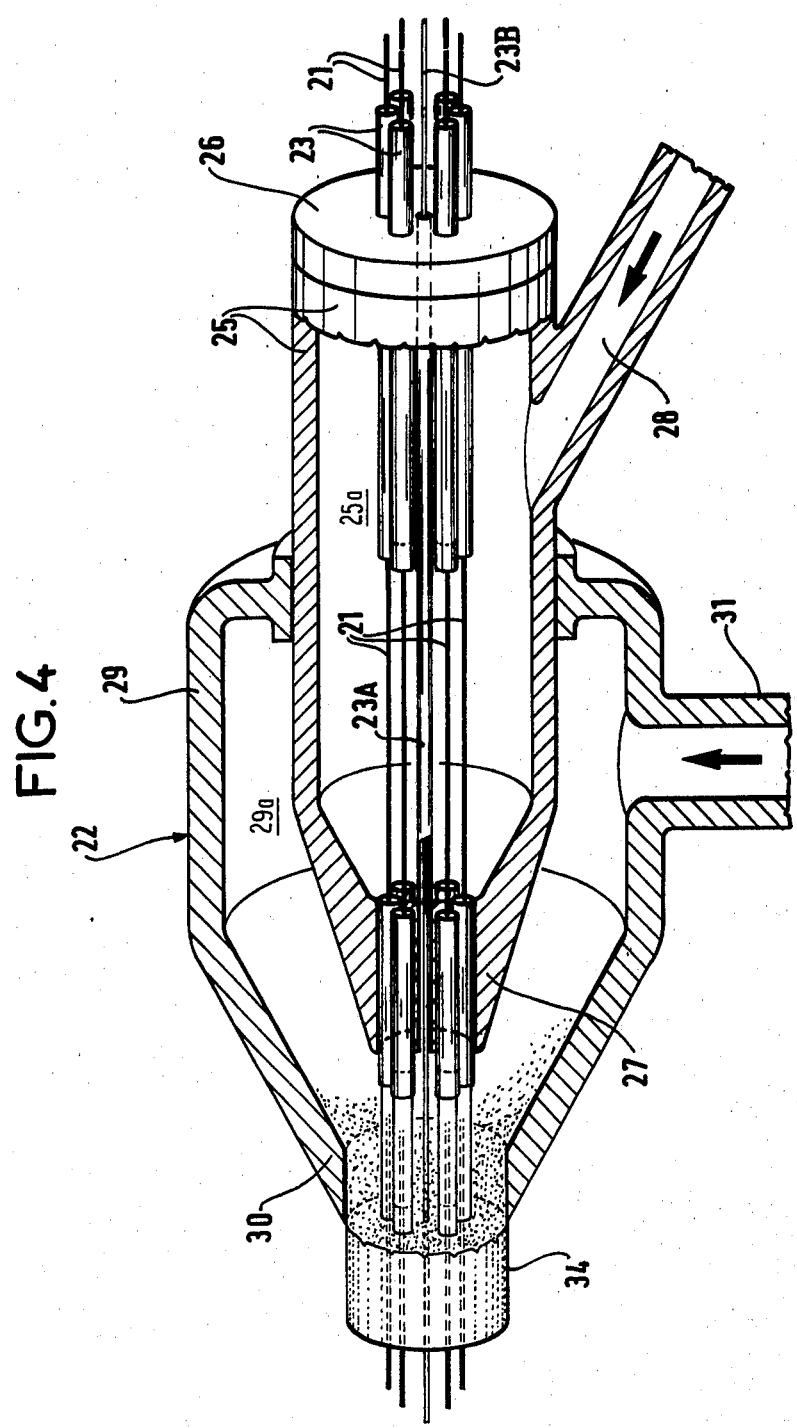

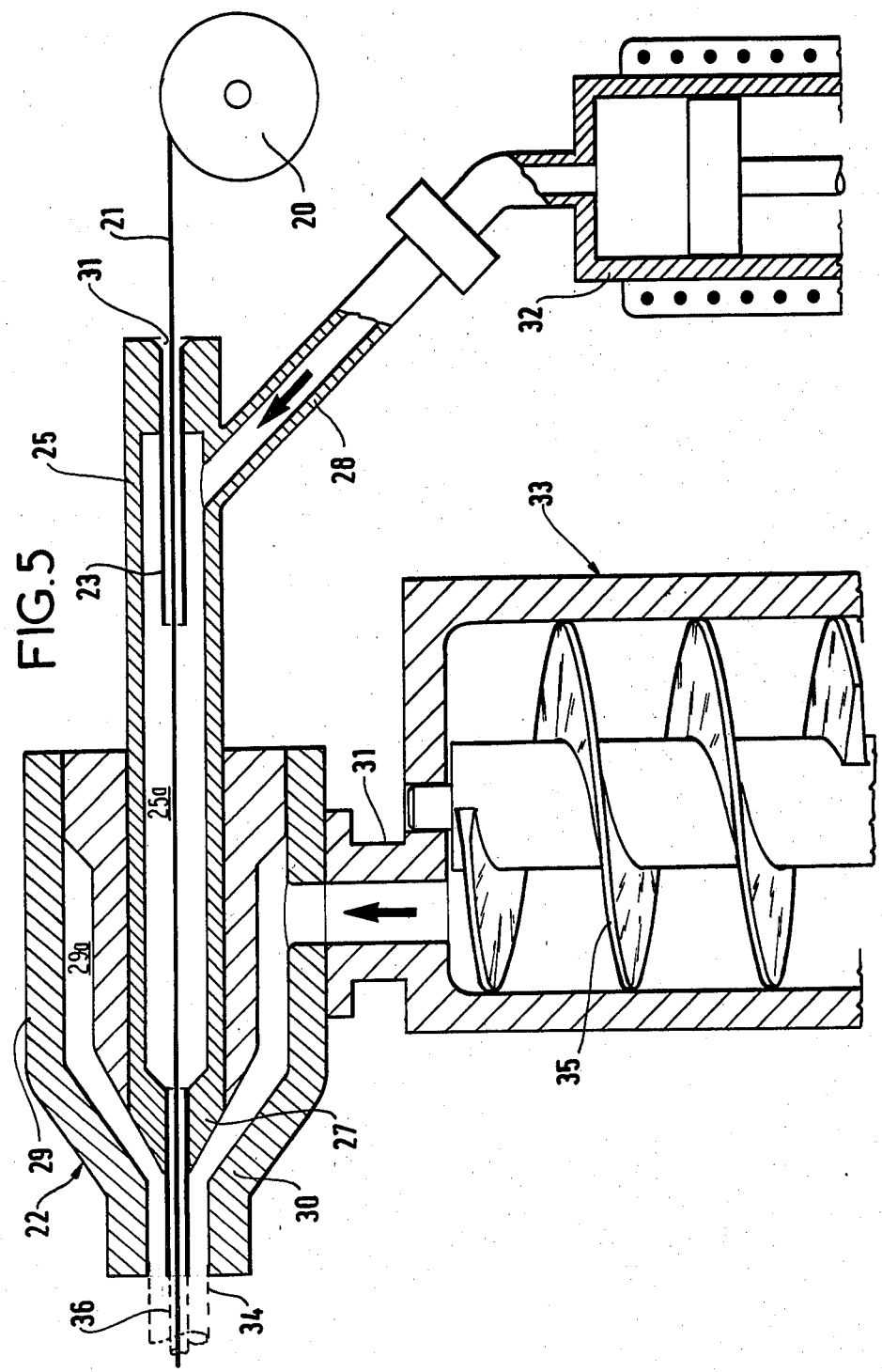

METHOD AND APPARATUS FOR MANUFACTURING A WATERTIGHT OPTICAL FIBER CABLE

The present invention relates to a method and apparatus for manufacturing an optical fiber cable of the type that comprises at least one cellular cylindrical structure of plastic material defining a plurality of longitudinal bores in which individual optical fibers are housed. The bores are of larger diameter than the fibers and the bore volume which is not occupied by the fibers is filled with a viscous substance.

BACKGROUND OF THE INVENTION

The usual methods of manufacturing such a cable have lead to difficulties in ensuring that the space inside the bores around the optical fibers is completely filled with the viscous substance. The viscous substance, has to be heated to make it fluid enough to fill the bores, and there is a tendency for it to shrink on cooling, thereby leaving voids.

Preferred implementations of the present invention remedy this drawback and provide a high quality fiber cable by means of a simple and speedy method using apparatus which is both simple and inexpensive.

SUMMARY OF THE INVENTION

The present invention provides a method of manufacturing an optical fiber cable of the type which comprises at least one tubular cylindrical structure of plastic material having a plurality of longitudinal bores housing individual optical fibers and filled with a viscous substance, wherein the optical fibers pass through respective tubes which each have a gap of some length; a viscous substance is injected under pressure into said tubes so that said viscous substance fills the tubes around the optical fibers; the optical fibers coated with said viscous substance are made to protrude beyond the ends of said tubes; a thermoplastic material is simultaneously extruded around the coated optical fibers through an annular orifice and under sufficient pressure to completely cover said optical fibers with their respective coatings of viscous substance; and the cylindrical structure thus obtained is then rapidly cooled.

Preferably, the viscous substance is injected and the thermoplastic substance is extruded under relative pressures such that radial expansion of the thermoplastic substance before it is cooled is avoided; and wherein the extruded product constitutes a uniform body occupying the space in between the optical fibers with their coatings of viscous substance. Advantageously, the movement of the cooled cylindrical structure is synchronized with the speed at which the bare optical fibers are inserted.

The apparatus in accordance with the invention comprises an inner cylindrical chamber with an upstream end plate and a conical downstream end which forms a nozzle. Optical fiber guide tubes which are parallel to the axis of the inner cylindrical chamber and which pass through an upstream end plate and through said conical downstream end and include an opening such that they can be filled with a viscous substance from the inner cylindrical chamber. A pipe supplies the viscous substance, said pipe communicating with said inner chamber. An outer cylindrical chamber supplies a melted thermoplastic substance, the downstream end of said outer chamber ending in a conical die which surrounds said nozzle of the inner cylindrical chamber. A pipe supplies a thermoplastic substance, said pipe communicating with said outer chamber.

It also preferably includes means for synchronizing the speed at which the cooled cylindrical structure is extruded with the speed at which the bare optical fibers are inserted in the inner chamber.

BRIEF DESCRIPTION OF THE DRAWINGS

Undersea optical fiber cables and a method and apparatus in accordance with the invention for manufacturing cylindrical structures which make up said cables are described with reference to the figures of the accompanying drawings, in which:

FIG. 4 is a perspective view in partial diametrical cross-section through an apparatus for manufacturing a cylindrical structure having longitudinal bores that house individual optical fibers and a filling viscous substance.

FIG. 5 is a diametrical cross-section through apparatus analogous to that in FIG. 4 and showing means for supplying the viscous substance and for supplying the thermoplastic material which constitutes the cylindrical structure.

DESCRIPTION OF PREFERRED EMBODIMENTS

Figure 1:
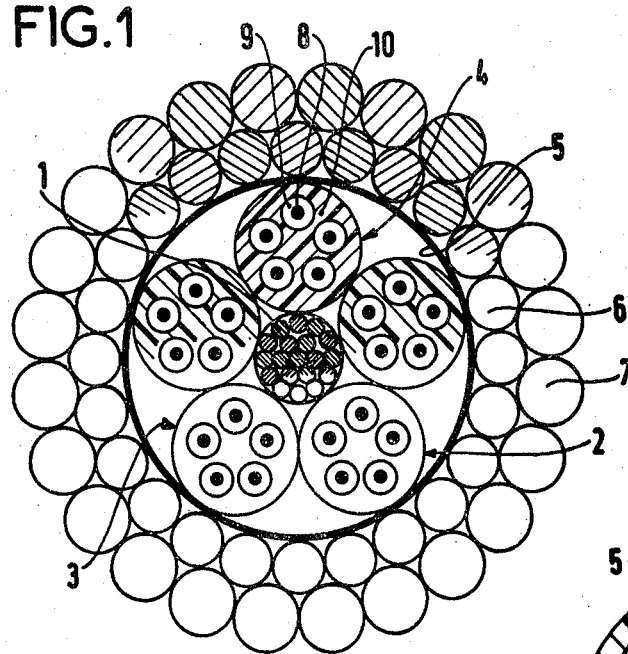
FIG. 1 is a transverse cross-section of a cable with a central carrier core and five cellular structures.

FIG. 1 shows a cable for use in oil drilling which, going from the center to the periphery of the cable, comprises:

A central strength member 1 made of strands of steel wire or of high tensile fibers of polyester or of aromatic polyamide, e.g. the polyamide "Kevlar" marketed by du Pont de Nemours.

Surrounding the strength member 1, there are five tubular structures such as those referenced 2, 3 & 4. These tubular structures have longitudinal bores 9 housing individual optical fibers 8 and filled with a viscous substance such as polybutene. The body of each tubular structure is made of a thermoplastic material 10, e.g. polyethylene, or a polyamide such as that marketed under the trade mark "Nylon" by du Pont de Nemours. The tubular structures are cylindrical in shape and they are helically wound round the central strength member.

A damper mattress 5 is made up of strips of glass-fiber fabric helically wound around the preceding layers.

Two layers 6 and 7 of high-tensile steel wires wound in opposite directions, constitute double armouring.

Figure 2:
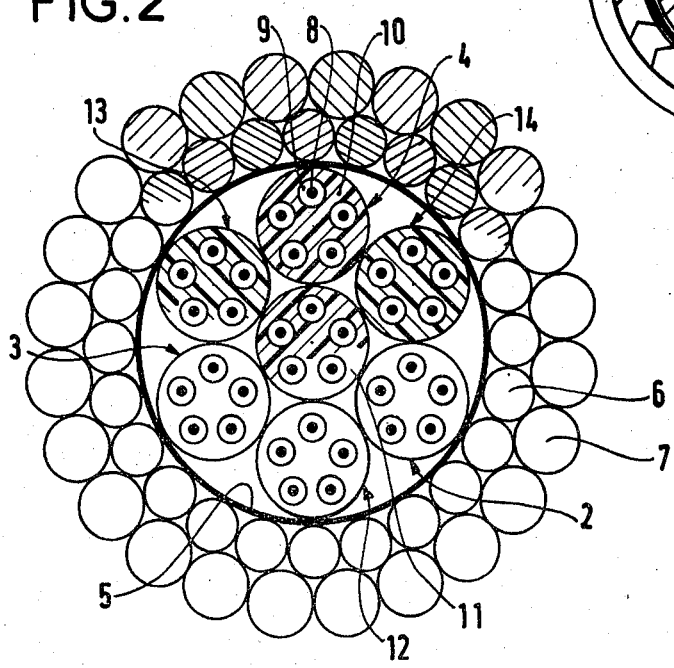
FIG. 2 is a transverse cross-section of a cable with seven cellular structures.

In the variant illustrated in FIG. 2, the central strength member 1 is replaced by tubular structure 11 analogous to the tubular structures 2,3, 4 of FIG. 1. This axial structure is surrounded by six other identical structures 2,3, 4 . . . of same diameter tangential to one another and helically wound around the axial cellular structure 11. Therefore as much of the available space as possible is occupied by fiber-carrying structures. The damper mattress 5 and the armour layers 6 and 7 are identical to those in FIG. 1.

Figure 3:
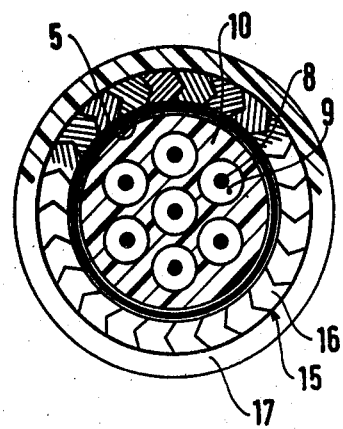
FIG. 3 is a transverse cross-section of a cable with an internal reinforcing member which prevents deformation due to water pressure.

FIG. 3 illustrates a variant for use as an undersea optical fiber cable. In this cable, a single tubular cylindrical structure constituted by a thermoplastic body 10 with seven longitudinal bores 9 housing individual optical fibers 8 filled with a viscous substance is covered with a mattress layer 5 formed by helically wound fiber glass tapes and then an armour layer 15 in the form of a vault constituted by steel wires 16 whose cross-section has generally V-shaped portions which interlock in one another so as to form a structure which cannot be deformed by water pressure. The whole is covered with an outer polyethylene sheath 17.

In FIG. 4, apparatus for forming a tubular structure is fed with bare or covered optical fibers 21 which come from one or several storage reels (not shown) placed upstream. Filling and extrusion apparatus 22 includes a nest of tubes 23 placed on or parallel to its axis, which tubes are surrounded by a cylindrical outer casing 25 which is closed at both ends. At the upstream end, the tubes pass through the plane partition or end wall 26. At the downstream end, the tubes pass through a conical nozzle 27 and project slightly beyond the end thereof. A central tube 23A is continuous and is provided for an inner metal component 23B designed to impart mechanical strength to the cable. It ends flush with the conical nozzle 27. The remaining tubes 23 are either discontinuous, as drawn, or are provided with a large opening where they pass through the filling chamber 25a defined by the casing 25. A filling substance (e.g. polybutene) in the liquid state flows in into the filling chamber via a feed tube 28 which passes through the side wall of the casing 25. The downstream end of the nozzle 27 constitutes the point of the nozzle built into thermoplastic extrusion apparatus.

An outer casing 29 is closed on its upstream end by the inner casing 25 and ends on its downstream end in a conical die 30 coaxial with the nozzle 27. It is connected by a side tube 31 to an extruding machine (not shown) for feeding with molten thermoplastic substance (polyethylene, polyamide, etc. . . ) which constitutes the body in which the longitudinal fiber-containing bores are formed. The resulting cellular structure is schematically illustrated at 34.

FIG. 5 illustrates schematically the apparatus as a whole. A reel 20 feeds optical fibers to the apparatus (for clearness' sake, only one fiber 21 is shown). The inlet nozzle 31 of a tube 22 guides the fiber as it enters the filling and extrusion apparatus. The bore-filling substance surrounds the optical fiber via the gap between the tube portions 23 and is urged forward by a heating gun 32 which feeds the pipe 28 that enters via the rear of the casing 25.

Further, the melted thermoplastic substance is discharged by the screw-type extruding machine 33 with an endless screw 35 that pushes said substance via pipe 31 into the space 29a between the punch 27 and the die 30 to constitute the plastic body of the cylindrical structure 34 in which cell a fiber-containing bore 36 is formed. Said bore is completely filled by virtue of the viscous substance applied around the fiber during its passage through the inner casing 25.

To carry out these operations properly, it is recommended that the following conditions be observed:

The viscous substance must be injected at a pressure such that the hot thermoplastic substance does not expand radially when it leaves the punch-die assembly.

The thermoplastic substance must be cooled immediately and rapidly at the outlet of the punch-die assembly to reduce longitudinal and radial shrinkage of the thermo-plastic substance to acceptable values, e.g. by means of a known water discharge apparatus (not shown).

The speed at which the bare or protected optical fiber is fed off the supply reel must be equal to that at which the completely cooled extruded structure moves. This can be achieved by means of apparatus (not shown) which is known per se and which is used for synchronizing the linear speed of the cold extruded product with the fibre unwinding speed.

I claim:

1. A method of manufacturing an optical fiber cable of the type which comprises at least one tubular cylindrical structure of plastic material having a plurality of longitudinal bores housing individual optical fibers and filled with a viscous substance, said method comprising the steps of:

passing the optical fibers through respective tubes which each have a gap of some length;

injecting a viscous substance under pressure into said tubes through said gaps so that said viscous substance fills the tubes around the optical fibers;

causing the optical fibers coated with said viscous substance to protrude beyond the ends of said tubes;

simultaneously extruding a thermoplastic material around the coated optical fibers through an annular orifice and under sufficient pressure to completely cover said optical fibers with their respective coatings of viscous substance;

maintaining the relative pressure of injection of the viscous substance and that of the extrusion of said thermoplastic material to prevent radial expansion of the thermoplastic material when it leaves the annular orifice before it is cooled; and rapidly cooling the cylindrical structure thus obtained such that the extruded thermoplastic material cools to solidification prior to said viscous substance and constitutes a uniform body occupying the space between the optical fibers and their coatings of viscous substance, and wherein there are no voids within the viscous substance between the thermoplastic material and said optical fibers.

2. A method according to claim 1, wherein the speed at which the cooled cylindrical structure is extruded is synchronized with the speed at which the bare optical fibers are inserted.

3. Apparatus for manufacturing an optical fiber cable of the type which comprises at least one tubular cylindrical structure of plastic material having a plurality of longitudinal bores housing individual optical fibers and filled with a viscous substance, said apparatus comprising:

an inner cylindrical chamber having an upstream end plate and a conical downstream end which forms a nozzle;

optical fiber guide tubes extending parallel to the axis of the inner cylindrical chamber and passing through said upstream end plate and through said conical downstream end, and wherein the portions of said guide tubes within said inner cylindrical chamber include openings such that they can be filled with a viscous substance under pressure from said inner cylindrical chamber;

a pipe for supplying the viscous substance under pressure to said inner cylindrical chamber, said pipe communicating with said inner cylindrical chamber;

an outer cylindrical chamber surrounding said inner cylindrical chamber and being spaced therefrom for supplying a melted thermoplastic substance under pressure, the downstream end of said outer chamber ending in a conical die surrounding said nozzle of said inner cylindrical chamber; and a pipe for supplying a thermoplastic substance under pressure, said pipe communicating with said outer chamber.

4. Apparatus according to claim 3, wherein said apparatus further includes means for synchronizing the speed at which the cooled cylindrical structure is extruded with the speed at which the bare optical fibers are inserted in the inner chamber.

* * * * *